Oct. 16, 1934.   A. J. SPANJERS ET AL   1,976,970
WEATHER STRIP FOR DOOR BOTTOMS
Filed May 23, 1932
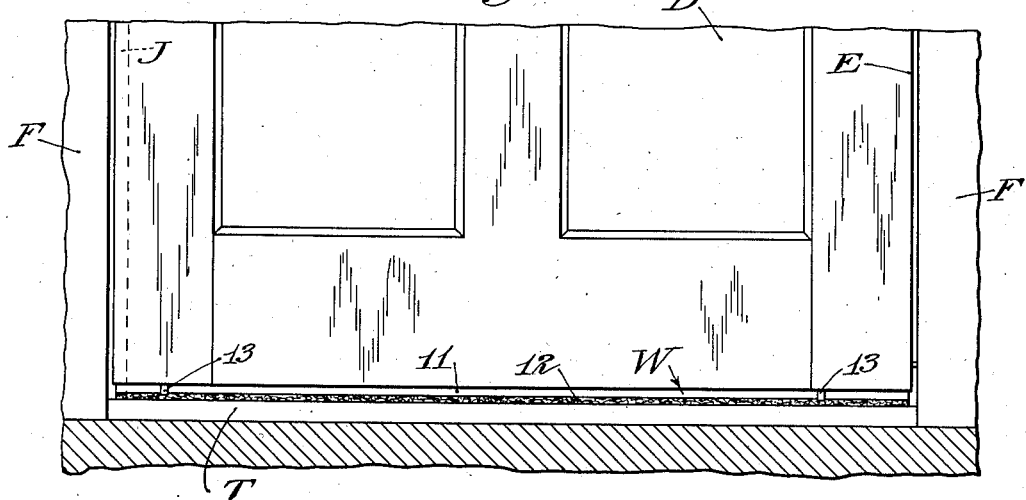
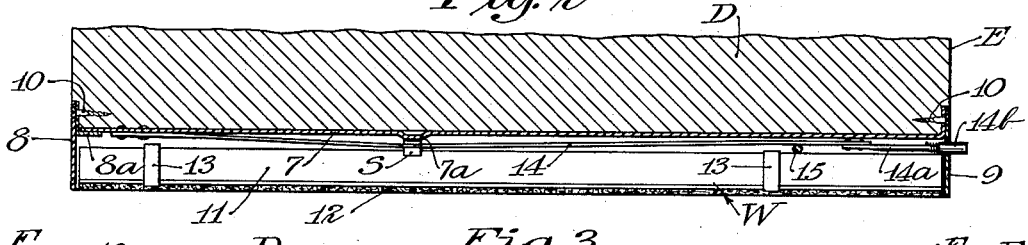
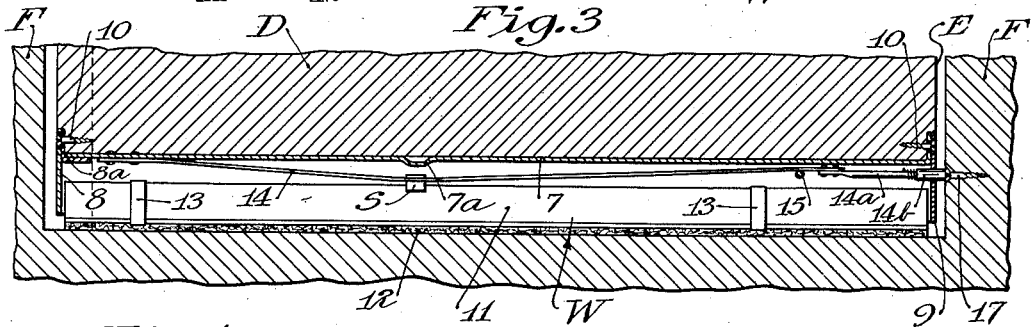
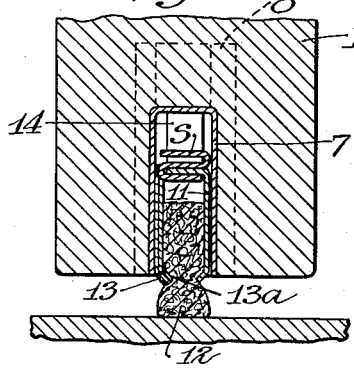
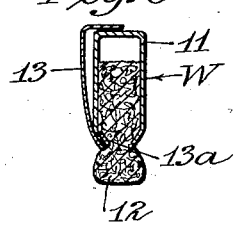
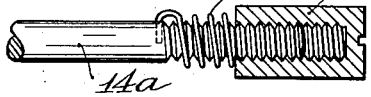
Inventors
Arnold J. Spanjers
Anton R. P. Spanjers
By their Attorneys
Williamson & Williamson Patented Oct. 16, 1934

1,976,970

UNITED STATES PATENT OFFICE 1,976,970

WEATHER STRIP FOR DOOR BOTTOMS

Arnold J. Spanjers and Anton R. P. Spanjers, Minneapolis, Minn.

Application May 23, 1932, Serial No. 612,994

1 Claim. (Cl. 20—68)

This invention relates to weather stripping and particularly to weather strip structure for the lower edge of a hinged door.

It is an object of our invention to provide simple, inexpensive and highly efficient weather strip structure for the bottom of a hinged door which will enable the door to be swung freely over rugs or thresholds and which will, nevertheless, when the door is closed, provide a weather tight seal between the lower edge of the door and the threshold or floor.

More specifically it is an object to provide a weather strip construction which is built into the lower edge of a hinged door and includes essentially an elongated draught-excluding or sealing element extending substantially the full width of the door and means for projecting the element downwardly and laterally against the floor or threshold as the door is swung into closed position and for retracting the weather strip element upwardly as the door is opened.

It is a further object to provide efficient structure of the class described which may be very easily installed in conventional doors and in which a single element is utilized both for the purpose of laterally projecting the weather strip as well as for retracting the same.

These and other objects and advantages of the invention will be fully set forth in the following description made in connection with the accompanying drawing, in which like reference characters refer to similar parts throughout the several views, and in which:—

Fig. 1 is a front elevation showing a lower portion of a swinging door in closed position with an embodiment of our invention applied thereto;

Fig. 2 is a vertical section taken medially of the thickness of the door and showing our appliance in the retracted position assumed when the door is opened;

Fig. 3 is a similar vertical section showing the weather strip in its projected or operative position engaged with the threshold or floor;

Fig. 4 is a cross section taken through the lower portion of the door showing the projected or operative position of the weather strip;

Fig. 5 is a fragmentary detailed view showing the thrust rod and its adjustable head, and Fig. 6 is a cross section through a portion of the strip detached showing one of the resilient compensating clips associated therewith.

Our appliance as shown is attached to a door D of the conventional hinged type, hinged along its edge E to one of the posts of a doorway. The doorway is provided with the usual jamb J, facings F and threshold T.

The bottom of the door is provided with a relatively deep groove running from the hinged edge to the free edge thereof. Within this groove is mounted the frame for our weather stripping appliance, which, as shown, comprises an elongated, inverted channel 7 having its open side substantially aligned with the lower edge of door D and having its ends closed by detachable end plates 8 and 9 respectively. The plate 8, as shown, carries an inwardly projecting lip 8a which is adapted to underlie the upward and intermediate web of channel 7. The end plates 8 and 9 are detachably secured to the free and hinged edges of the door, respectively, by suitable means, such as the screws 10, which screws may pass through upturned ears of the upper web of channel 7 to also secure the channel against downward displacement.

The inverted channel 7 houses an elongated weather strip indicated as an entirety by the letter W and as shown comprising an inverted channel 11 which may be constructed of sheet metal having its longitudinal edges inturned somewhat to clamp an elongated pad or compressible strip 12 which may be constructed of felt, rubber or other suitable weather sealing material.

Weather strip W extends substantially the full width of the door D and preferably carries at spaced points thereon a pair of compensating clips 13 which are constructed from resilient material and which have inturned lower ends secured between the compressible strip 12 and the channel frame 11. The bodies of said strips extend upwardly and normally diverging from the adjacent side of the channel frame 11 and having inturned upper ends 13a which overlie the top of the channel or strip holder. Clips 13 serve to yieldingly engage one of the sides of the housing channel 7 to cause the weather strip W to fit snugly therein with some slight frictional engagement.

Weather strip element W is connected with the channel housing 7 and is moved therein by means of a resilient thrust element 14 mounted within the top of the channel housing 7 and adapted to be downwardly bowed at its intermediate portion. Thrust element 14 comprises an elongated strip of resilient spring material affixed at one end (the end adjacent the free edge of the door) to the top of channel 7. The opposite end of spring strip 14 passes between a keeper pin 15 and the top of the channel and terminates in a thrust member or portion 14a which is preferably in the form of a short rigid rod secured to the adjacent end of spring strip 14 and having an adjustable thrust head 14b carried at its end, said thrust head being slidably mounted in an apertured portion of the end plate 9 and projecting for some distance beyond said plate for engagement with the post of the doorway, when the door is approaching extreme closed position. As shown, thrust head 14b comprises an elongated cylindrical cap having threaded engagement with the outer end of rod 14a and provided with a slotted outer end adapted to be engaged by a screw driver to facilitate adjustment. A coil spring 16 surrounds rod 14a and has one of its ends affixed to said rod while its other end is in abutment with the edge of head 14b for the purpose of preventing said head from threadedly working inwardly upon successive operations of the door.

The weather strip element W is detachably connected with the intermediate portion of spring strip 14 by suitable means such as an S-clip or hook "S" (as best shown in Fig. 4). One hook of the S engages a slotted portion adjacent the top and intermediate part of the strip holder or channel 11 of the element W and the other hook of the S engages and embraces the medial portion of the spring strip 14. The top of channel housing 7 is dented or bulged inwardly medially between its ends for the purpose of limiting the inward or retracted movement of the strip 14 to prevent said strip from assuming a dead center position with reference to its ends.

A screw or metallic stud 17 is preferably countersunk in the edge or post of the doorway upon which door D is hinged, properly located for engagement with the thrust head 14b when the door is brought to fully closed position.

*Operation*

When the door is standing ajar the sealing element or weather strip W is held within the channel or housing 7 by means of the elongated spring strip 14. It will be noted by reference to Fig. 2 that in the retracted position of the weather strip the spring strip 14 is bowed slightly below dead center position due to the engagement of the S clip, or, if desired, of the spring strip itself, with the indented or bulged portion 7a at the top of channel 7.

In the inward swinging movement of the door just before it reaches fully closed position, the head 14b of the thrust rod is forcibly pressed against the door post or more exactly, against the metallic stud or screw 17. Head 14b and rod 14a are consequently thrust inwardly, causing the spring strip 14 to bow considerably as shown in Fig. 3. The bowing of said spring projects the weather strip element W downwardly and laterally until the felt or pad engages the threshold or floor under some tension. The connection between weather strip W and spring strip 14, it will be noted, is not located at precisely the center of the strip but is disposed beyond the center toward the free edge of the door. This is done for the purpose of causing the portion of the weather strip adjacent the hinged edge of the door to be first projected in the initial opening of the door, the weather strip tilting from said end toward its outer end as it is being projected laterally. This tilting is effected, of course, by gravity, the connecting clip S acting as a fulcrum point.

It will also be noted that in the bowing of the spring clip 14, since one of its ends is rigidly connected to the top of channel 7, weather strip W will have a tendency to move longitudinally toward the free edge of the door. The end plate 8 arrests any such longitudinal movement of the weather strip and the S-clip S will slide slightly upon the spring strip 14.

The projection depth of the weather strip W may be varied considerably by threadedly adjusting the head 14b of the thrust rod. Likewise, if it is desired to detach or replace the weather strip, thrust head 14b may be screwed outwardly, enabling the spring clip to be bent sufficiently by manually depressing the thrust rod so that the S clip will be projected beyond the open edge of channel housing 7.

From the foregoing description it will be seen we have provided an extremely simple but highly efficient weather strip for door bottoms which may be manufactured at low cost and which may be easily and quickly installed within a longitudinal groove formed in the lower edge of a conventional door. The actuation of the weather strip is quite sudden, taking place only in the extreme closing movement of the door. A door with our appliance attached may therefore be opened or closed without interference with rugs, mats, thresholds and the like, since the strip is retracted before the free edge of the door has swung open more than two or three inches.

Our structure provides a resiliently held draught proof seal between the lower edge of the door and the threshold or floor.

It will, of course, be understood that various changes may be made in the form, details, proportions and arrangement of the parts without departing from the scope of our invention, which, generally stated, consists in a device capable of carrying out the objects above set forth and in the novel parts and combinations of parts disclosed and defined in the appended claim.

What is claimed is:

Weather stripping for door bottoms comprising an elongated inverted horizontal guide channel mounted in the lower edge of a door, an elongated sealing element mounted in said channel for lateral, projective movement, said sealing element comprising an inverted channel carrying at its lower and open end a compressible, elongated sealing element, an elongated, flat, resilient actuating member disposed substantially horizontally and free from tension within the upper portion of said guide channel and having its outer end fixed flush against the top of said guide channel and its inner end provided with an enlarged, straight thrust head, means at the inner end of said guide channel for affording a slide bearing for said thrust head, said thrust head projecting beyond the hinge edge of the door for engagement with the post portion of the doorway, means for adjusting the projection of said thrust head beyond the hinge edge of the door, and an S-shaped clip, one bend of which engages a slotted portion in the upper edge of said sealing channel and medially of the same and the other bend of which engages said resilient actuating member said clip spacing said sealing channel from said actuating member and affording a fulcrum action between said actuating member and said sealing member, the point of connection between said sealing strip and said actuating element being forward of the medial portion of said sealing strip to cause an advance sealing of the forward portion of said strip when the same is projected.

ARNOLD J. SPANJERS.
ANTON R. P. SPANJERS.